United States Patent [19]

Farkas et al.

[11] Patent Number: 5,263,071
[45] Date of Patent: Nov. 16, 1993

[54] SPACER FOR RETAINING FUEL RODS IN A NUCLEAR REACTOR FUEL ASSEMBLY

[75] Inventors: Tibor Farkas; Ragnar Månsson; Olov Nylund, all of Västerås, Sweden

[73] Assignee: ABB Atom AB, Västerås, Sweden

[21] Appl. No.: 849,092

[22] Filed: Mar. 9, 1992

[30] Foreign Application Priority Data

Mar. 13, 1991 [SE] Sweden .................................. 9100753

[51] Int. Cl.[5] .................................................. G21C 3/34
[52] U.S. Cl. .................................... 376/438; 376/462; 376/442
[58] Field of Search ............... 376/462, 438, 441, 261, 376/442, 443; 976/DIG. 73, DIG. 80

[56] References Cited

U.S. PATENT DOCUMENTS

| | | | |
|---|---|---|---|
| 3,510,397 | 5/1970 | Zettervall | 376/441 |
| 3,746,617 | 7/1973 | Iwao et al. | 376/442 |
| 3,746,619 | 7/1973 | Iwao | 376/442 |
| 3,844,887 | 10/1974 | Georges et al. | 376/442 |
| 4,396,573 | 8/1983 | Feutrel | 376/442 |
| 4,622,204 | 11/1986 | Feutrel | 376/442 |
| 4,740,351 | 4/1988 | Katsumizu et al. | 376/446 |
| 4,772,447 | 9/1988 | Manson et al. | 376/441 |
| 4,842,814 | 6/1989 | Takase et al. | 376/438 |
| 5,133,927 | 7/1992 | Kadano et al. | 376/462 |

Primary Examiner—Donald P. Walsh
Assistant Examiner—Meena Chelliah
Attorney, Agent, or Firm—Watson, Cole, Grindle & Watson

[57] ABSTRACT

A spacer for retaining parallel, elongated fuel rods includes a plurality of cells which are formed from tubular sleeves internally provided with fixed supports and at least one spring arranged opposite to the fixed supports. The spring is intended to make contact with a fuel rod inserted into the sleeve and is formed as a leaf spring which is cut out of the wall of the sleeve and which, when the sleeve is empty, is bent into the sleeve. The leaf spring is adapted, in tensioned position when the fuel rod is inserted into the sleeve, to be returned to a position substantially coinciding with the wall of the sleeve.

4 Claims, 2 Drawing Sheets

SPACER FOR RETAINING FUEL RODS IN A NUCLEAR REACTOR FUEL ASSEMBLY

BACKGROUND AND SUMMARY OF THE INVENTION

The present invention relates to a spacer with a plurality of cells for retaining elongated fuel rods, arranged in parallel, into a bundle in a nuclear reactor fuel assembly. It is important that these spacers, which are placed spaced from each other along the bundle, do not form too high a resistance to the coolant flow which flows inside the fuel assembly along the bundle and through the spacers.

There are known spacers in which the cells of the spacer are formed from tubular sleeves which are composed into a so-called spacer grid for positioning the fuel rod extending through the sleeves. Each sleeve has been internally provided with fixed supports and spring means for fixing a fuel rods extending through the sleeve, the spring means being formed from a leaf spring cut out of the wall of the sleeve. Also when a fuel rod has been in position in the tubular sleeve, the leaf spring belonging to this sleeve has for the most part still extended into the sleeve. A considerable part of the space between the fuel rod and the sleeve has then been occupied by the leaf spring. This, in turn, has led to a high flow resistance through the spacer.

According to the invention, this drawback is now avoided in that the leaf spring, in tensioned position when the fuel rod is inserted into the sleeve, is returned by the fuel rod to a position substantially coinciding with the wall of the sleeve. In this way, the space between the fuel rod and the sleeve is almost entirely freed from the flow-preventing effect of the spring means.

According to a particularly suitable embodiment, the spring means is formed from a leaf spring which is cut out of the wall of the sleeve and extends transversally in relation to the longitudinal axis of the sleeve. The respective sleeve is then suitably internally provided with at least one first pair of laterally separated fixed supports at one level in the sleeve and a second, similarly arranged, pair of laterally separated fixed supports at another level in the sleeve. The spring means is arranged opposite to the fixed supports such that it makes contact with a fuel rod, inserted into the sleeve, at a point between the levels for the fixed supports.

Because the leaf spring is arranged to extend transversally in relation to the longitudinal axis of the sleeve, the leaf spring can be made sufficiently long to provide a suitably soft resilience without the length of the sleeve, and hence the flow resistance of the spacer, having to be increased.

To facilitate returning the leaf spring to a position coinciding with the sleeve wall, the leaf spring is provided at its end with a contact surface which is bent out towards the centre of the sleeve.

An additional way to improve the resilience is to design the leaf spring to be wider at its base than at its free end.

Further, the leaf spring should be cut out with as slots in the sleeve as narrow as possible to prevent lateral flow of the cooling water in the spacer.

BRIEF DESCRIPTION OF THE DRAWINGS

The invention will be most readily understood with reference to the accompanying FIGS. 1-3, wherein.

DETAILED DESCRIPTION OF THE PREFERRED EMBODIMENT

Figure 2:
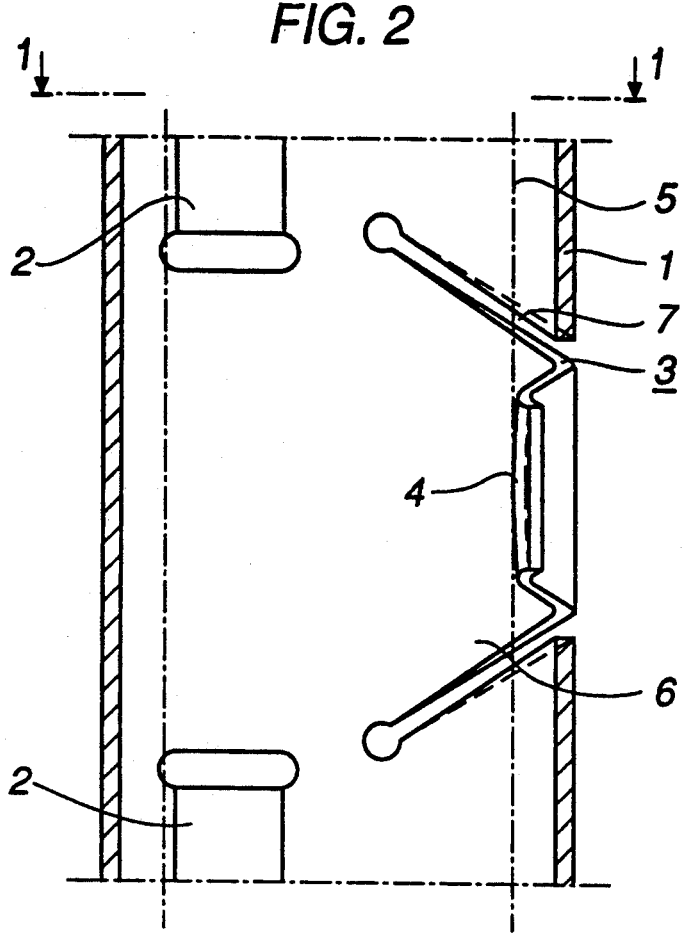
FIG. 2 a section of the sleeve in FIG. 1 as seen along line 2—2, and FIG. 3 schematically shows sleeves composed into a spacer inside an outer frame.
Figure 1:
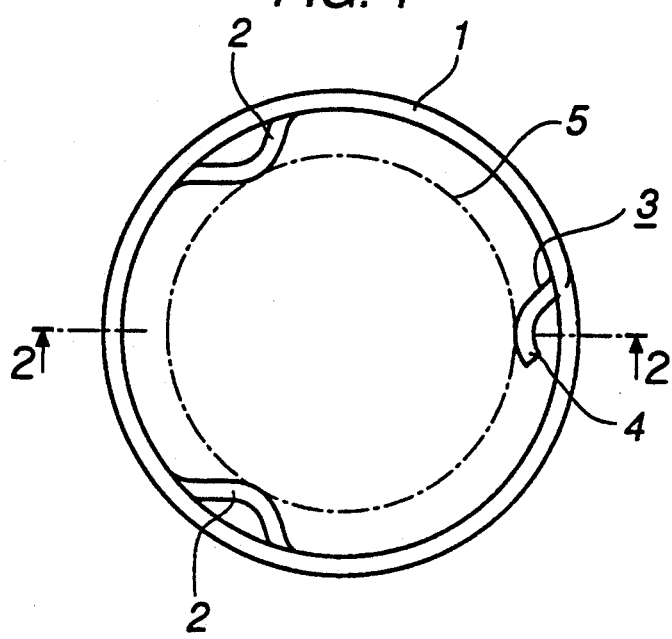
FIG. 1 is a view of a sleeve in the spacer as seen along 1—1 of FIG. 2.

In FIG. 1, 1 designates a tubular sleeve which is internally provided with fixed supports 2 and a spring means 3 with a bent-out contact surface 4 which makes contact with an outlined fuel rod 5. FIG. 2 shows how the spring means 3, which consists of a leaf spring 6 with a head 3a having a bent-out contact surface 4, has been cut out of the sleeve 1 by means of narrow slots 7. The leaf spring 6 with the contact surface 4 is bent such that it extends into the sleeve 1 when the sleeve 1 is empty, a width dimension of the head portion extending in parallel with a longitudinal axis of the sleeve. In FIGS. 1 and 2 it has been assumed that a fuel rod 5 is in position in the sleeve 1 and the leaf spring 6 returned to a position which, according to the invention, coincides with the sleeve wall. The figures also show that the total number of the fixed supports 2 is four, two of which being arranged at an upper plane and two at a lower plane. The fuel rod 5 is pressed against these four fixed supports 2 by the oppositely positioned spring means 3 which is pressed against the fuel rod 5 at a point midway between the fixed supports 2. From FIG. 2 it is further clear that the leaf spring 6 cut out of the sleeve is considerably wider at its base 3b, that is, where the leaf spring 6 is joined to the sleeve 1, than at its free head end, thus obtaining improved resilience.

Figure 3:
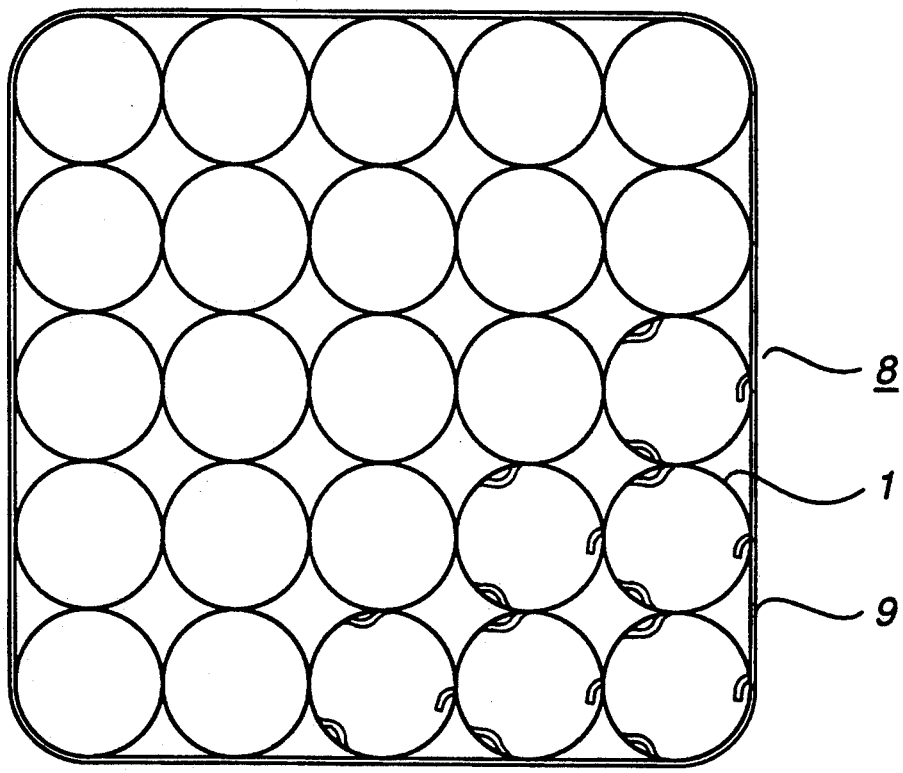

FIG. 3, finally, schematically shows how the sleeves 1 have been composed to form a spacer 8 with several cells arranged inside an outer frame 9.

We claim:

1. A spacer for use with a plurality of elongated fuel rods so as to position said elongated fuel rods in parallel and provide a bundle in a nuclear reactor fuel assembly, said spacer comprising a plurality of tubular sleeves through which said fuel rods respectively extend, each tubular sleeve including fixed support means therein and at least one spring means for pressing a fuel rod in said tubular sleeve against said support means, each spring means comprising a portion of said tubular sleeve cut and bent into a leaf spring having an inwardly-directed abutment head whose width dimension is parallel to a longitudinal axis of said tubular sleeve, said leaf spring being pushed outwardly to a position substantially coinciding with a remainder of said tubular sleeve when pressed against a fuel rod positioned in said tubular sleeve.

2. A spacer according to claim 1, wherein each tubular sleeve includes a pair of fixed support means spaced apart along the longitudinal axis of the tubular sleeve, wherein a spring means is located so as to contact a fuel rod in the tubular sleeve between said pair of fixed support means.

3. A spacer according to claim 1, wherein each said leaf spring has a base portion which converges towards said head portion.

4. A spacer according to claim 3, wherein said base portion is separated from the remainder of said tubular sleeve by narrow slots.

* * * * *